Patented Jan. 1, 1952

2,580,647

UNITED STATES PATENT OFFICE 2,580,647

PREPARATION OF A PHOSPHORIC ACID-CARBON CATALYST

Mitchell S. Bielawski, Chicago, Ill., assignor to Universal Oil Products Company, Chicago, Ill., a corporation of Delaware No Drawing. Application May 29, 1948, Serial No. 30,218

7 Claims. (Cl. 252—423)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing a hydrocarbon conversion catalyst which has a high crushing strength during use.

Another object of this invention is a highly active catalyst suitable for use in the polymerization of olefinic hydrocarbons and in other hydrocarbon conversion reactions involving olefins.

One specific embodiment of this invention relates to a process for manufacturing a solid catalyst which comprises mixing a phosphoric acid and an organic material of vegetable origin comprising essentially carbon, hydrogen and oxygen, drying and calcining the resultant mixture.

Another embodiment of this invention relates to a process for manufacturing a solid catalyst which comprises mixing a phosphoric acid and an organic material of vegetable origin comprising carbon, hydrogen, and oxygen, heating and stirring the mixture to form a composite, forming the composite into shaped particles, drying and calcining the shaped particles.

Still another embodiment of this invention relates to a process for manufacturing a solid catalyst which comprises mixing a cellulosic material with a phosporic acid, heating the mixture of cellulosic material and phosphoric acid to form a composite, and calcining said composite.

A further embodiment of this invention relates to a process for manufacturing a solid catalyst which comprises mixing a cellulosic material with a phosphoric acid, heating and stirring the cellulosic material and phosphoric acid to form a composite, forming the composite into shaped particles, drying and calcining the shaped particles.

A still further embodiment of this invention relates to a process for manufacturing a solid catalyst which comprises heating and mixing a phosphoric acid with a substantially dry, finely divided cellulosic material, further heating the mixture to form a charred composite, forming the charred composite into shaped particles, drying and calcining the shaped particles.

The essential and active ingredient of the solid catalysts which are manufactured by the present process for use in organic reactions is an acid of phosphorus, preferably one in which the phosphorus has a valence of 5. The acid may constitute 50% or more of the catalyst mixture ultimately produced, and in most cases is over 25% by weight thereof. Of the various acids of phosphorus, orthophosphoric acid ($H_3PO_4$) and pyrophosphoric acid ($H_4P_2O_7$) find general application in the primary mixtures, due partly to their cheapness and the readiness with which they may be procured although the invention is not restricted to their use but may employ any of the other acids of phosphorus insofar as they are adaptable. It is not intended to infer, however, that the different acids of phosphorus which may be employed will produce catalysts which have identical effects upon any given organic reaction as each of the catalysts produced from different acids and by slightly varied procedure will exert its own characteristic action.

In using orthophosphoric acid as a primary ingredient, different concentrations of the aqueous solution may be employed from approximately 75 to 100% or acid containing some free phosphorus pentoxide may even be used. (By this is meant that the ortho acid may contain a definite percentage of the pyro acid corresponding to the primary phase of dehydration of the ortho acid.) Within these concentration ranges, the acids will be thick liquids of varying viscosity and readily incorporated with absorbent materials. In practice it has been found that pyrophosphoric acid corresponding to the formula $H_4P_2O_7$ can be incorporated with carbonizable organic materials at temperatures somewhat above its melting point (142° F.) and that the period of heating which is given to the pyroacid-absorbent mixtures may be different from that employed with the ortho acid.

Triphosphoric acid which may be represented by the formula $H_5P_3O_{10}$ may also be used as a starting material for preparation of the catalysts of this invention. My catalyst composites may also be prepared from the organic materials (mentioned hereinafter) and phosphoric acid mixtures containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$, which in turn may be considered as the acid resulting when three molecules of water are lost by 4 molecules of orthophosphoric acid, $H_3PO_4$. The tetraphosphoric acid may be manufactured by the gradual and controlled dehydration by heating or ortho or pyrophosphoric acid or by adding phosphorus pentoxide to these acids in proper amount. When the latter procedure is followed, phosphorus pentoxide is added gradually (while absorbing the heat of the reaction) until it amounts to 520% of the total water present. After a considerable period of standing at ordinary temperatures, the crystals of the tetra acid separate from the viscous liquid and it is found that they melt at approximately 93° F. and have a specific gravity of 1.1886 at 60° F. However, it is unnecessary to crystallize the tetra acid before employing it in the preparation of the solid catalyst as the crude tetraphosphoric acid mixture may be incorporated with the carbonizable organic material.

Organic materials which are admixed with a phosphoric acid or mixture of phosphoric acids, are preferably ground or otherwise formed into fine powders such as will pass through a 30-mesh screen. These organic materials are preferably of vegetable origin, and include lignin, sugar, starch, flour, cellulose, wood flour, peat, and various cellulose-containing agricultural wastes including bagasse, straw, cornstalks, corncobs, corn husks, oat hulls, and the like.

This method of forming an active solid phosphoric acid catalyst is carried out by mixing a finely divided organic material, such as wood flour, ground corncobs, and the like, with a phosphoric acid which is preferably preheated to a temperature of from about 100° to about 160° F. in order to increase the ease of mixing. Thus composites may be formed from about 25 to about 50% by weight of organic material and from about 75 to about 50% by weight of phosphoric acid. The mixing and heating of the composite are then continued so as to further char the carbonaceous material producing a rubbery, spongy like mass that is mixed with water to form a plastic mixture which may be formed into particles by suitable means such as by extrusion or by pressing the paste-like material into holes in a metal plate or by other means. The dry charred catalyst composite may also be formed into pellets by a pilling machine. The formed particles are then heated further to remove moisture and other volatile materials, thus hardening the formed particles, which are then heated or calcined further, preferably in the absence of air, to produce a substantially solid catalytic material with a high crushing strength. The drying of the formed catalyst particles is usually carried out at a temperature of from about 300° to about 400° F. and the dried catalyst particles are then calcined further, generally at a temperature of from about 400° to about 1200° F. and preferably at a temperature of from about 850° to about 1100° F.

The resultant catalyst which has been calcined is active for polymerizing olefinic hydrocarbons, particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth is preferably employed as a granular layer in a heated reactor, generally steel, through which the preheated hydrocarbon fraction is directed. The solid catalyst of this process may thus be employed for treating mixtures of hydrocarbon vapors to effect olefin polymerization, but this same catalyst may also be used at operating conditions suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical treating tower and the olefin containing gas mixture is passed downwardly therethrough at a temperature of from about 350° to about 550° F., and at pressures of 100 to about 300 pounds or more per square inch when dealing with olefin-containing materials such as stabilizer reflux which may contain from approximately 10 to 50% of propylene and butylenes. When operating on a mixture comprising essentially butanes and butylenes, this catalyst is effective at conditions favoring the maximum utilization of both normal butylenes anad isobutylene which involves mixed polymerization at temperatures of from approximately 275° to about 325° F. and at pressures of from about 500 to 1500 pounds per square inch.

In utilizing the catalyst of this invention for promoting miscellaneous organic reactions, the catalysts may be employed in essentially the same way as they are used when polymerizing olefins, in case the reactions are essentially vapor phase and they may be employed in suspension also in liquid phase in various types of equipment.

With suitable modifications in the details of operation, the present type of catalyst may be employed in a large number of organic reactions, including polymerization of olefins as already mentioned. Typical cases of reactions in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc., reactions involving the hydro-halogenation of unsaturated organic compounds, isomerization reactions, ester formation by the interaction of carboxylic acids and olefins, etc. The specific procedure for utilizing the present type of catalyst in miscellaneous organic reactions will be determined by the chemical and physical characteristics and the phase of the reacting constituents.

During use of my catalysts in vapor phase polymerizations and other vapor phase treatments of organic compounds, it is sometimes advisable to add small amounts of moisture to prevent excessive dehydration and consequent decrease in catalyst activities. In order to substantially prevent loss of water from the catalyst an amount of steam or water vapor is added to the charged olefinic gas so as to substantially balance the vapor pressure of the catalyst. This amount of water vapor varies from about 0.1 to about 6% by volume of the organic material charged.

The following examples of the preparation of a catalyst comprised within the scope of this invention and of results obtained in its use for polymerizing olefinic gases are characteristic, although the exact details set forth are not to be construed as imposing undue limitations upon the generally broad scope of the invention.

EXAMPLE I

Bagasse pulp was ground in a hand operated flour mill to a flour that passed through a No. 30 screen. Into 70.2 grams of pyrophosphoric acid at 60° C., were stirred gradually 43.8 grams of bagasse flour. At first, the bagasse mixed in readily but as its amount in the acid increased, the mixture became stiffer and had to be warmed somewhat to decrease its viscosity to a thinner syrup by effecting a partial decomposition of the bagasse to a sweetish caramel-like substance. After all the bagasse was added and was mixed uniformly with the acid, the mixture had a consistency of a stiff paste. Then the mixture was heated strongly, until there was a sudden partial decomposition of the bagasse evidenced by the incomplete loss in weight of only 6.94 grams. At this point the mixture began to grow very rapidly like dough and the stirring broke it up into soft rubbery like balls. This soft solid was ground while hot in a mortar. Into 25.7 grams of this powder were stirred 6.4 cc. of water to form a plastic-like mixture. This wet mixture was pressed into $\frac{5}{32}$ inch pills in a 100 hole steel mold and immediately the wet pills were punched out into an evaporating dish (without a preliminary predrying as in case of lignin-phosphoric acid pills) and dried two hours at 392° F. and then one hour at 1100° F. in air to form a catalyst referred to hereinafter as catalyst No. 1.

Some of the material formed as described above except that the final calcination was at 980° F. yielded a material which is referred to hereinafter as catalyst No. 2.

Catalyst No. 3 was prepared from 34.5 grams of bagasse and 45.2 grams of 85% orthophosphoric acid. It took only a small fraction of the bagasse to absorb all of the 85% $H_3PO_4$; so approximately 200 cc. of water had to be added to insure the phosphoric acid being uniformly dispersed throughout the bagasse flour. This mixture was heated vigorously and gradually charring set in after the moisture was driven off. However, the steam from the decomposition kept the charring mixture moist. The charred mixture was finally ground to a powder. To 20 grams of this powder 5 cc. of water were added and the wet mixture was pilled according to technique used for catalyst No. 1. The wet pills were finally calcined 2 hours at 392° F. and 1 hour at 980° F.

A number of bagasse-pyrophosphoric acid catalysts differing in composition and calcination temperatures were studied. The proportions of the starting materials were

| Bagasse | Pyrophosphoric acid |
|---|---|
| Per Cent | Per Cent |
| 26.1 | 73.9 |
| 38.4 | 61.6 |
| 49.7 | 50.3 | and calcination temperatures of 860°, 980°, and 1100° F. were employed. The three best results were summarized in Table 1. Catalyst No. 1 consisting of 38.4% bagasse and 61.6% phosphoric acid and calcined at 1100° F., polymerized 84% of the propylene from an approximately 50–50 mixture of propane and propylene after 2 hours at 450° F. in an 850 cc. rotating autoclave. This catalyst crushed initially at 23.2+ lbs. and after test at 24.4+ lbs.

Catalyst No. 2 identical in the proportions of starting material to catalyst No. 1 but calcined at 980° F. gave the even higher olefin conversion of 90.6%, but, though it had a very high initial crushing strength of 21.8 lbs. its strength fell to 8.1 lbs. after use. It also developed about 11% fines, or three times as much as catalyst No. 1.

Catalyst No. 3, formed from 49.7% bagasse and 50.3% pyrophosphoric acid, had the still higher olefin conversion of 92.7%, but its initial crushing strength was only 5.4 lbs. and its final crushing strength was 8.2 lbs. The strength of the catalyst appeared to increase during the reaction of the propane-propylene mixture in the rotating autoclave. The crushing strength of this catalyst can be increased substantially by a calcination at 1100° F. without a decrease in its activity below 85% propylene conversion in view of the improvement in the after use crushing strength of catalyst No. 1 over that of catalyst No. 2 as a result of raising the calcination temperature from 980° to 1100° F. Moreover, since the percentage of pill fines is decreased to a third in catalyst No. 1 of what it was in catalyst No. 2, a further decrease of pill fines can be reasonably expected, if a catalyst of the composition of catalyst No. 3 were calcined at 1100° F.

Table 1

PREPARATION OF POLYMERIZATION CATALYST FROM BAGASSE AND PYROPHOSPHORIC ACID AND DETERMINATION OF ACTIVITIES OF CATALYSTS IN FORM OF 5/32 INCH PILLS ]

| Catalyst No. | 1 | 2 | 3 |
|---|---|---|---|
| Composition-Bagasse, per cent | 38.4 | 38.4 | 49.7 |
| Pyrophosphoric acid, per cent | 61.6 | 61.6 | 50.3 |
| Calc. Temp. ° F _____ 2 hours | 392 | 392 | 392 |
| Calc. Temp. ° F _____ 1 hour | 1,100 | 980 | 980 |
| Catalyst Composition: | | | |
| Per Cent Total $P_2O_5$ | 63.6 | 62.5 | |
| Per Cent Free $P_2O_5$ | 54.5 | 51.6 | |
| Crushing Strength, lbs | 23.2+ | 21.8 | 5.4 |
| Average bulk density | 0.69 | 0.69 | |
| Activity test, g. catalyst charged to autoclave | 10.0 | 10.0 | 10.0 |
| Charge stock, Propane-Propylene: | | | |
| Mol. per cent propylene | 53.1 | 53.1 | 53.1 |
| Gms. charged | 100.5 | 96.0 | 98.5 |
| Polymerization Test Conditions: | | | |
| Temp. ° C | 232 | 232 | 232 |
| Reaction time, hours | 2 | 2 | 2 |
| Max. Press. atms | 62 | 55 | 60 |
| Products, gms.: | | | |
| Gas. Calc. from Vol | 56.1 | 50.5 | 52.2 |
| Polymer outside liner | 36.6 | 38.3 | 39.0 |
| Liner contents | 11.8 | 12.6 | 14.8 |
| Total | 104.5 | 101.4 | 106.0 |
| Unaccounted for | 6.0 | 4.6 | 2.5 |
| Per Cent Propylene Conv. (gas anal.) | 84.2 | 90.6 | 92.7 |
| Used Catalyst: | | | |
| Crushing Strength, Lbs | 24.4+ | 8.1 | 8.2 |
| Per Cent Pill fines | 3.4 | 10.7 | 2.8 |
| Appearance | (1) | (1) | (1) |

1. No change in original black color of Catalyst.

EXAMPLE II

The same procedure was followed as that used in Example I, but the quantities and materials used were 38.4 grams of ground corncobs and 61.6 grams of pyrophosphoric acid. There was only a 5 gm. loss in weight after the mixture was heated to the point where the rubbery, spongy, solid formed. This weight loss was too small for complete decomposition. The pills were molded from a mixture consisting of 97 grams of the ground spongy solid and 24 cc. of water. The pills were punched out of the pill plate without predrying and then dried 2 hours at 392° F. and half the pills were calcined 1 hour at 1100° F. (Catalyst No. 4); the other half were calcined 1 hour at 980° F. (Catalyst No. 5).

Table 2

[PREPARATION OF POLYMERIZATION CATALYSTS FROM GROUND CORNCOBS AND PYROPHOSPHORIC ACID AND DETERMINATION OF ACTIVITIES OF CATALYSTS IN FORM OF 5/32 INCH PILLS]

| Catalyst No. | 4 | 5 |
|---|---|---|
| Composition, Corncobs, Per Cent | 38.4 | 38.4 |
| Pyrophosphoric Acid, Per Cent | 61.6 | 61.6 |
| Calcination Temp. °F_____2 hours | 392 | 392 |
| Calcination Temp. °F_____1 hour | 1,100 | 980 |
| Total $P_2O_5$ in catalyst, Per Cent | 55.9 | 58.6 |
| Free $P_2O_5$ in catalyst, Per Cent | 39.0 | 47.6 |
| Crushing Strength, lbs | 26.4+ | 25.6+ |
| Average bulk density | 0.80 | 0.78 |
| Activity test, g. catalyst charged to autoclave | 10.1 | 10.1 |
| Charge stock, Propane-Propylene: | | |
|   Mol. Per Cent Propylene | 51.1 | 51.1 |
|   Grams charged | 100.0 | 101.5 |
| Test Conditions: | | |
|   Temp. °C | 232 | 232 |
|   Reaction time, hrs | 2 | 2 |
|   Max. Pressure, atms | 70 | 80 |
| Products, grams: | | |
|   Gas calcd. from volume | 76.5 | 70.7 |
|   Polymer outside liner | 17.5 | 14.9 |
|   Liner contents | 11.3 | 21.6 |
|   Total | 105.3 | 107.2 |
|   Unaccounted for | 4.8 | 4.4 |
|   Per Cent Propylene Conversion (gas. anal.) | 40.3 | 55.3 |
| Used Catalyst: | | |
|   Crushing strength, lbs | 26.2+ | 19.4+ |
|   Per Cent Pill fines | 0 | 0 |
|   Appearance | (¹) | (¹) |

¹ No change in original black color.

Two corncob-pyrophosphoric acid catalysts were studied. In each, the ratio of organic matter to phosphoric acid was identical to that of the bagasse catalysts Nos. 1 and 2 since both carbonaceous materials have approximately the same ash content, but one corncob catalyst (catalyst No. 5) was calcined at 980° F. while the other (catalyst No. 4) at 1100° F. Catalyst No. 5 gave a propylene conversion of 55.3% and its crushing strength fell from 25.6+ to 19.4 lbs. On the other hand, though catalyst No. 4 underwent no change from its excellent initial crushing strength of 26.4+ lbs., its propylene conversion was only 40.3%.

A slight modification in the pilling technique originally used in the preparation of a lignin-pyrophosphoric acid catalyst (Example III) was introduced, and this improved the structure of the pill. Instead of predrying the wet pills in the steel mold and then punching the pills from the mold, the wet pills were sufficiently strong to maintain their form during punching out without predrying and did not stick together. This technique produced a superior pill becaues the sides of the pill were not confined by the walls of the mold and the moisture was free to escape from all the pill surfaces during drying and calcining instead of only through the top and bottom surfaces if the pill were predried while in the mold. Accordingly, the escaping moisture did not exert a rupturing influence upon the pill. It is apparent from the results of this new pilling technique that the catalysts of this invention could be prepared satisfactorily on a commercial scale by the usual extrusion operation. Accordingly, pills structurally superior to the best pills prepared by the new technique are expected from an extruding operation because the mixture of organic material and phosphoric acid can be compressed more compactly and uniformly in an extruder than is the case when manually molding the pills in a pill plate.

EXAMPLE III 76.8 grams of powdered lignin was stirred gradually into 117.3 grams of molten pyrophosphoric acid (just above its melting point). A very thick plastic mass formed that could be stirred only with difficulty even when hot. Evolution of sulfur dioxide decreased the viscosity somewhat. On continued heating the mass became rubbery, then spongy, and when cold could be ground with some difficulty to a powder. A total of 178.9 grams of this powder was obtained, and 100 grams of it was mixed with approximately 40 grams of water. The resulting mixture was molded into $\frac{3}{16}$" pills in steel pill plates, dried half an hour at 392° F., and punched out of the pill plates. The pills were then dried an additional half hour at 392° F., 1 hour at 500° F., and finally 1 hour at 860° F.

As in Examples I and II, activity tests on this catalyst were carried out by placing 10.1 grams of $\frac{3}{16}$" (4.7 mm.) pills of this catalyst and 100 grams of propane-propylene mixture (50–55% propylene content) in a rotatable steel autoclave of 850 cc. capacity rotated at a temperature of 450° F. for two hours. By this means, it was found that catalyst No. 6 formed from pyrophosphoric acid and lignin, showed 78% conversion of propylene into normally liquid polymers whereas another solid catalyst formed from diatomaceous earth and pyrophosphoric acid polymerized 66% of the propylene. Moreover, as indicated in Table 3, the catalyst of this example had as good an initial crushing strength as the phosphoric acid-diatomaceous earth catalyst and underwent very little change after use while the phosphoric acid-diatomaceous earth catalyst lost about one-half of its original crushing strength. Although 27% of the fresh pills of the catalyst of this example and 30% of the used pellets had a crushing strength of less than 6 pounds, a high fraction with 19.5 pounds crushing strength for the fresh pills and 16 pounds crushing strength for the used pills indicated the superior strength of the lignin-pyrophosphoric acid catalyst of Example III. Furthermore, preliminary tests have shown that this catalyst can be converted into very hard, although shrunken pills, at a somewhat higher calcination temperature.

Table 3

[ACTIVITIES AND CRUSHING STRENGTHS OF CATALYSTS PREPARED FROM LIGNIN AND PYROPHOSPHORIC ACID AND FROM DIATOMACEOUS EARTH AND PYROPHOSPHORIC ACID]

| Catalyst No. | 6 | 7 |
|---|---|---|
| Description-Lignin, Per Cent | 39.6 | 0 |
| Pyrophosphoric Acid, Per Cent | 60.4 | 72 |
| Diatomaceous Earth, Per Cent | 0 | 28 |
| Form | Molded Pill | Extruded Pill |
| Size, in | $\frac{3}{16}$ | $\frac{3}{16}$ |
| Calcination, Temp. °F | ¹ 392 | 662 |
|   Do | ¹ 500 | 680 |
|   Do | ¹ 860 | |
| Crushing Strength, lbs | 10.0 | 11.4 |
| Grams charged to autoclave | 10.1 | 10.0 |
| Propane, Propylene Charge Stock: | | |
|   Mol. Per Cent Propylene | 55.5 | 50.2 |
|   Grams charged | 100.0 | 100.0 |
| Test Conditions: | | |
|   Temperature, °C | 233 | 233 |
|   Reaction time, hrs | 2 | 2 |
|   Max. Pressure, atms | 75 | 85 |
| Products, gms.: | | |
|   Gas. calc. from vol | 55.8 | 63.9 |
|   Polymer outside liner | 38.1 | 28.1 |
|   Liner contents | 11.7 | 11.9 |
|   Total | 105.6 | 104.1 |
|   Unaccounted for | 4.5 | 5.9 |
|   Per Cent Propylene Conv. (gas anal.) | 78.6 | 66.5 |
| Used Catalyst: | | |
|   Crushing Strength, Lbs | 8.7 | 5.4 |
|   Per Cent Pill Disintegration | 1.0 | |
|   Ave. Bulk Density | 0.49 | 0.94 |
|   Appearance | Black | Black |

¹ One hour.

EXAMPLE IV

A mixture of lignin and pyrophosphoric acid prepared in the same proportions as in Example III was calcined for 1 hour at a temperature of 1100° F. The resulting catalyst mixture had a crushing strength of 18.2 pounds on pellets of 1/8 inch diameter. After a polymerization test with 43% propylene conversion on a mixture of propane and propylene (55.5%) these pellets had a crushing strength of 16.1 pounds.

The foregoing examples in which bagasse, corncobs and lignin were composited with pyrophosphoric acid show that such organic materials of vegetable origin and generally cellulosic in nature yield carbonaceous material on heating with the phosphoric acid and that this material serves as a support for phosphoric acid. The resultant composite of carbonaceous materials and phosphoric acids are satisfactory polymerization catalysts although the exact properties such as activity and crushing strength do depend upon the particular organic starting material employed, the methods of forming into particles, and the calcination treatment used. These catalysts formed from cellulosic starting materials and phosphoric acids are generally superior in crushing strength and catalyst life to other solid phosphoric acid catalysts prepared heretofore by calcination of composites of phosphoric acid and siliceous absorbents, such as diatomaceous earth.

I claim as my invention:

1. A process for the manufacture of a solid catalyst which consists of mixing from about 25% to about 50% by weight of a substantially dry finely divided organic material of vegetable origin comprising essentially carbon, hydrogen and oxygen and from about 75% to about 50% by weight of a phosphoric acid at a temperature of from about 100° F. to about 160° F., continuing said mixing and heating to form a charred composite of the organic material and phosphoric acid, thereafter mixing said charred composite with a sufficient amount of water to form a plastic mixture and forming the plastic mixture into shaped particles, drying the shaped particles at a temperature of from about 300° F. to about 400° F., thereafter calcining the dried particles at a temperature of from about 400° F. to about 1200° F. for a time such as to retain in excess of 25% by weight of phosphoric acid in said particles, and recovering the thus calcined particles as the product of the process.

2. A process for the manufacture of a solid catalyst which consists of mixing from about 25% to about 50% by weight of a substantially dry finely divided cellulosic material and from about 75% to about 50% by weight of a phosphoric acid at a temperature of from about 100° F. to about 160° F., continuing said mixing and heating to form a charred composite of the cellulosic material and phosphoric acid, thereafter mixing said charred composite with a sufficient amount of water to form a plastic mixture and forming the plastic mixture into shaped particles, drying the shaped particles at a temperature of from about 300° F. to about 400° F., thereafter calcining the dried particles at a temperature of from about 400° F. to about 1200° F. for a time such as to retain in excess of 25% by weight of phosphoric acid in said particles, and recovering the thus calcined particles as the product of the process.

3. The process of claim 2 further characterized in that said dried particles are calcined at a temperature of from about 850° F. to about 1100° F.

4. The process of claim 2 further characterized in that said cellulosic material comprises bagasse.

5. The process of claim 2 further characterized in that said cellulosic material comprises corncobs.

6. The process of claim 2 further characterized in that said cellulosic material comprises lignin.

7. A process for the manufacture of a solid catalyst which consist of mixing from about 25% to about 50% by weight of a substantially dry finely divided organic material of vegetable origin comprising essentially carbon, hydrogen and oxygen and from about 75% to about 50% by weight of a phosphoric acid at a temperature of from about 100° to about 160° F. to form a composite, forming said composite into shaped particles, drying the shaped particles at a temperature of from about 300° F. to about 400° F., thereafter calcining the dried particles at a temperature of from about 400° F. to about 1200° F. for a time such as to retain in excess of 25% by weight of phosphoric acid in said particles, and recovering the thus calcined particles as the product of the process.

MITCHELL S. BIELAWSKI.

REFERENCES CITED

The following references are of record in the file of this patent:

UNITED STATES PATENTS

| Number | Name | Date |
|---|---|---|
| 1,438,113 | Hudson | Dec. 5, 1922 |
| 1,525,770 | Ernst et al. | Feb. 10, 1925 |
| 1,551,075 | Thieneman | Aug. 25, 1925 |
| 1,610,399 | Urbain | Dec. 14, 1926 |
| 1,621,195 | Ernst et al. | Mar. 15, 1927 |
| 1,694,040 | Ray et al. | Dec. 4, 1928 |
| 1,819,165 | Hass | Aug. 18, 1931 |
| 1,885,141 | Ray | Nov. 1, 1932 |
| 1,903,834 | Oberle | Apr. 18, 1933 |
| 2,083,303 | Krczil | June 8, 1937 |
| 2,216,756 | Scheffler | Oct. 8, 1940 |
| 2,276,679 | Abbott | Mar. 17, 1942 |

FOREIGN PATENTS

| Number | Country | Date |
|---|---|---|
| 201,163 | Great Britain | Feb. 7, 1924 |
| 273,683 | Great Britain | June 15, 1927 |
| 294,214 | Great Britain | Sept. 5, 1929 |